(No Model.) 2 Sheets—Sheet 1.
S. C. HUNTER.
MEAT TENDERER.
No. 440,635. Patented Nov. 18, 1890.
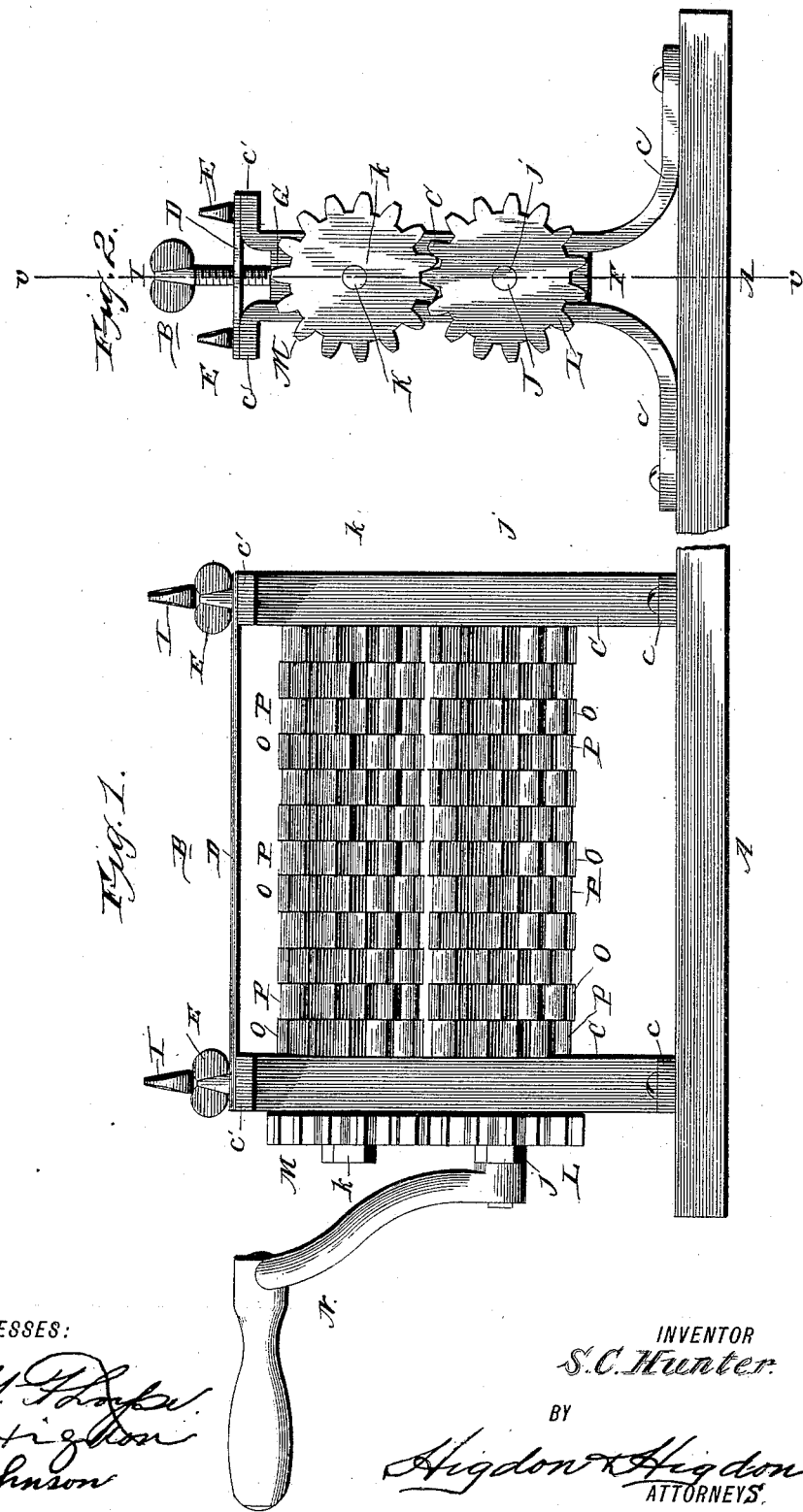
WITNESSES:
INVENTOR
S. C. Hunter
BY
Higdon & Higdon
ATTORNEYS

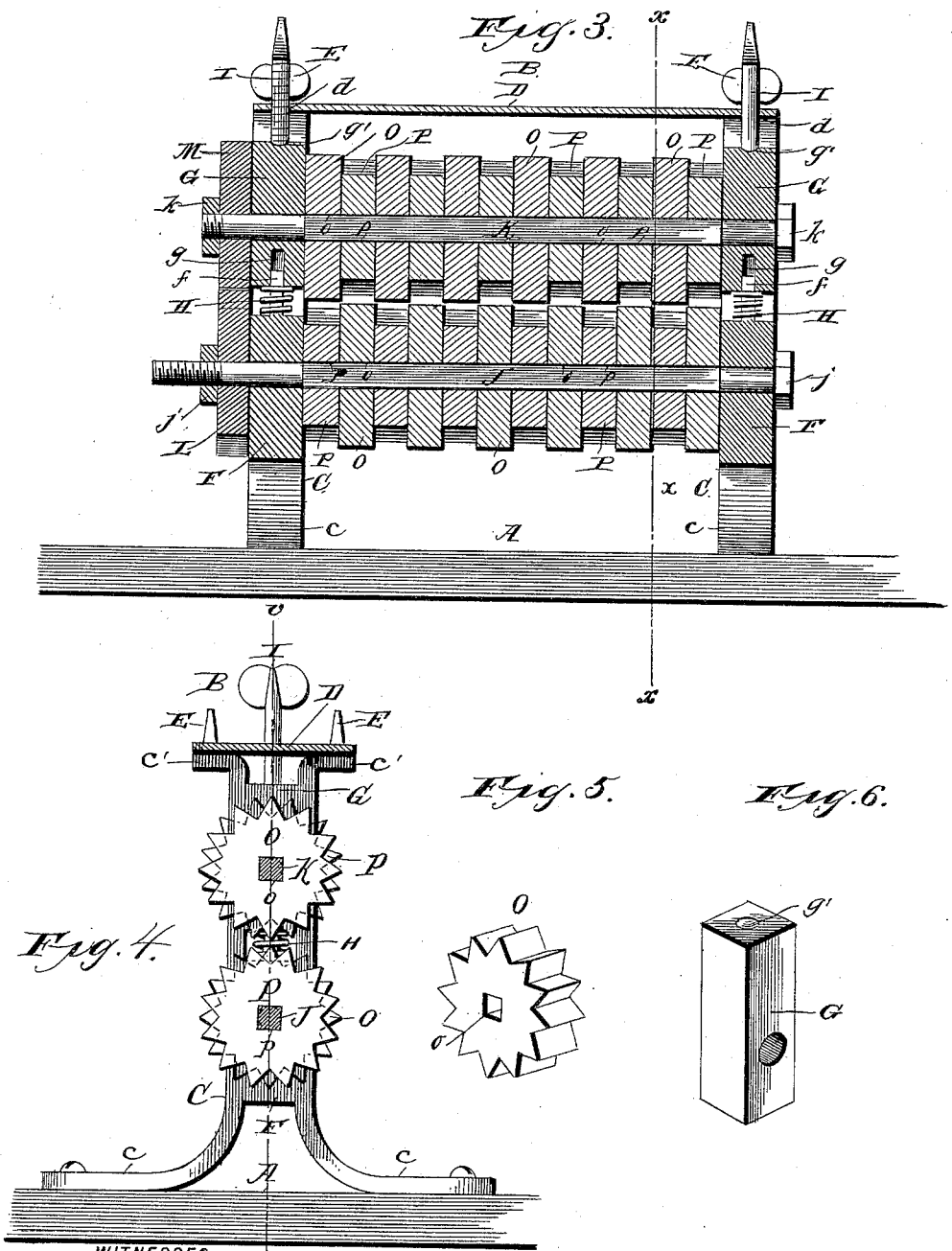

UNITED STATES PATENT OFFICE.

SAMUEL C. HUNTER, OF HOLTON, KANSAS.

MEAT-TENDERER.

SPECIFICATION forming part of Letters Patent No. 440,635, dated November 18, 1890.

Application filed July 10, 1890. Serial No. 358,258. (No model.)

*To all whom it may concern:*

Be it known that I, SAMUEL C. HUNTER, of Holton, Jackson county, Kansas, have invented certain new and useful Improvements in Meat-Tenderers, of which the following is a full, clear, and exact description, reference being had to the accompanying drawings, forming a part hereof.

My invention relates to an improvement in meat-tenderers; and it consists in certain novel features of constuction, which will be hereinafter specified, and particularly pointed out in the claim.

My object is to provide a tenderer having the cylinders thereof composed of serrated disks which are so arranged that the teeth are opposite the interdental spaces of the disk of the opposite shaft. These disks are also so arranged that the teeth of the adjoining disk on the same shaft form an irregular line of teeth throughout the whole length of the cylinders formed by said disks, as will be readily understood. The object in having the cylinders composed of independent disks is to allow the removal and replacing of a disk, if it becomes necessary, by reason of breakage or otherwise.

Referring to the drawings, Figure 1 is a side elevation of my improved meat-tenderer secured in position on the end of a table or other suitable place. Fig. 2 is an end elevation of the same with the handle removed. Fig. 3 is a central vertical longitudinal section of the tenderer, on the line *v v* of Figs. 2 and 4, with the handle detached. Fig. 4 is a section on line *x x* of Fig. 3. Fig. 5 is a detail perspective view of one of the serrated disks. Fig. 6 is a detail perspective view of one of the sliding blocks.

Similar letters refer to similar parts in all the figures.

A represents a table or other suitable place upon which rests the tenderer B, composed of the vertical supports C, having the outwardly-extending flanges *c* at their lower ends, through which bolts are passed to secure it on said table. The tenderer may be portable, if desirable, by securing it upon an indepenpent platform, and the short flanges *c'* at their upper ends, upon which is secured the top plate D by means of the thumb-screws E, which engage in screw-threaded openings in the flanges *c'*. The supports C have the blocks F integral therewith, which blocks also have the upwardly-extending rods *f* secured to or cast integral therewith. Adjustable blocks G, having the openings *g* in which the projecting rod *f* of the blocks F engage, are secured immediately above the blocks F and in the grooves or open spaces of the supports C. Coiled round the projections *f*, and bearing against the upper and lower ends of the blocks F and G, respectively, are the springs H. Thumb-screws I, passing through the screw-threaded openings *d* of the top plate D, rest or bear in the concave recesses *g'* of the blocks G. The shafts J and K pass through the horizontal cylindrical openings in the blocks F and G, and have the meshing cog-wheels L and M thereon, either end of said shafts being screw-threaded and engaged by nuts *j* and *k*, one end of the shaft L being lengthened and having thereon the handle N. That portion of the shafts J and K between the opposite supports C is rectangular in cross-section and has thereon the disks O and P, the peripheries of which are serrated, as shown. These disks are provided with the rectangular axial openings *o* and *p* to cause the disks, when the machine is operated, to revolve with the shafts, each of the corners of the axial openings in the disks P being upon the same radius as the crown of a peripheral tooth, while each of the corners of the axial openings in the disks O is upon the same radius as a peripheral interdental space. To secure the irregular alignment of the teeth mentioned, the disk O is first placed upon the shaft. The disk P is then revolved one-quarter way round and placed upon the shaft against the disk O, thus bringing the teeth of the disk P opposite the space between the teeth of the disk O, as is shown in Fig. 4. On the opposite shaft the disk O is placed opposite the disk P to allow the teeth of one to engage or be opposite to the interdental spaces of the other.

In operation the meat is placed between the cylinders composed of the serrated disks O and P. The machine is then operated by means of the handle N, the teeth of the disks engaging the meat, and, revolving in one direction, draws it between and through the cylinders, thus tendering the meat, as will be readily understood, or to secure more effective tendering the cylinders, by the oscillation of the handle N, cause the meat to pass and repass between said cylinders. The blocks G, carrying the shaft K and upper cylinder, are vertically adjustable to allow meat of unusual thickness to pass between the cylinders by operating the thumb-screws I, which, being in vertical alignment with the projections $f$ of blocks F and being engaged in the concave recesses $g'$ in the blocks G, serve as a guide to said blocks G as they are forced upward by the springs H, thus carrying the cylinder bodily, as will be readily understood, the teeth of the engaging-cogs L and M being of sufficient radial length to allow such adjustment without impairing the revoluble movement of the cylinders, as will be readily understood.

Having thus described my invention, what I claim, and desire to secure by Letters Patent, is—

In a meat-tenderer, the combination of two revolving angular shafts and two series of toothed disks having axial openings therein, the said series of disks being alternately placed upon each of the said shafts, the corners of the axial openings of the one series of disks being upon the same radii as the crown of the peripheral teeth, and the corners of the axial openings of the remaining series being upon the same radii as peripheral interdental spaces, as described.

In testimony whereof I affix my signature in presence of two witnesses.

SAMUEL C. HUNTER.

Witnesses:
GEO. G. THORPE,
J. E. HIGDON.